W. HARRISON.
Purifying and Concentrating Salt Brine.
No. 161,412. Patented March 30, 1875.
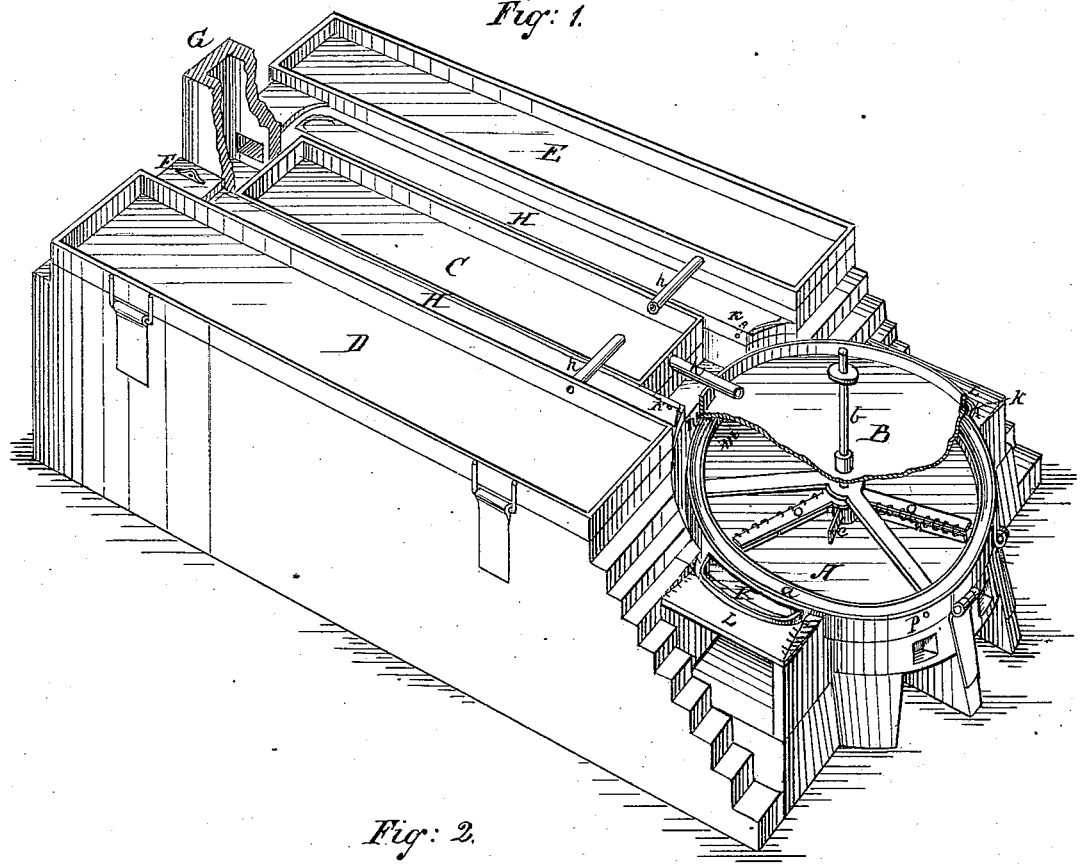
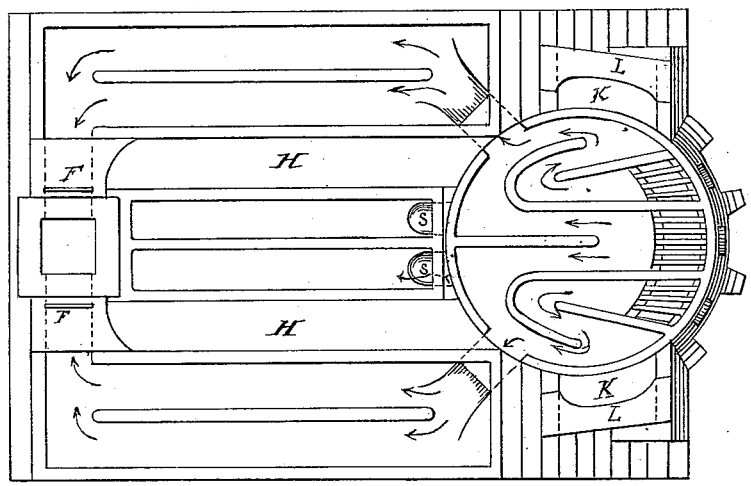
Witnesses:
Robert H. Duncan
Benj. A. Smith
Inventor:
William Harrison

UNITED STATES PATENT OFFICE.

WILLIAM HARRISON, OF LIVERPOOL, ENGLAND.

IMPROVEMENT IN PURIFYING AND CONCENTRATING SALT-BRINE.

Specification forming part of Letters Patent No. 161,412, dated March 30, 1875; application filed December 22, 1874.

*To all whom it may concern:*

Be it known that I, WILLIAM HARRISON, of the borough of Liverpool, England, have invented certain new and useful Improvements in the Art of Purifying and Concentrating Salt-Brines, of which the following is a specification:

It is well understood that many of the rich saline waters from which chloride of sodium or common salt is manufactured hold in solution variable quantities of foreign compounds, chief among which and most difficult of separation are the sulphates and chlorides of lime and magnesia. Unless these foreign compounds are removed from the brines during the earlier stages of their concentration great difficulty will attend the subsequent operations, and the quality of the salt produced will be materially vitiated. The method generally employed for the concentration of these impure brines is, to commence and complete the operation in deep kettles set directly over the fires of the furnace, fresh brine being run into and manufactured salt taken from the same kettle, while a portion of the sulphates and chlorides of lime and magnesia is caught in ladles constructed to fit the lower part of the kettles. The difficulties incident to this method of manufacture are numerous and of a serious character, and much study and experiment have been given to obviate them. Prominent among these are, first, the slowness of the evaporation of the brine, owing to the considerable depth of the kettles for the purpose of conducting the deposits of foreign substances upon the ladles, and the coarser and inferior quality of the salt produced, by reason of the slow concentration of the brine; second, the great damage and destruction to the kettle, caused by the deposit of a considerable quantity of the foreign compounds, which cannot be removed by this method, and which during the operation become firmly incrusted upon the sides and bottom of the kettles, where they come in contact with the intense heat of the furnace. The coating of these deposits, by reason of its non-conducting property, prevents the heat from passing freely to the brine, and thus materially retards the concentration, and at the same time, by excluding the moisture from the inner surface of the kettles, causes them to be rapidly burned out. The destruction of the kettles from this cause is immense. The object of my invention is to obviate these difficulties, and to produce, at far less labor and expense, a much purer and finer article of merchantable salt.

My invention consists in removing from the brine during the early stage of its concentration the foreign compounds which it holds in solution by heating the brine in one or more broad and shallow pans, set at such a distance from the furnace and over the flues thereof that the temperature will be sufficient to raise the brine to the point of saturation, but not enough to injure the pans, and completing the concentration of the brine in other pans, likewise broad and shallow, placed directly over the grates of the furnace.

My process embraces two distinct stages, and requires in theory but two pans, one for each stage, although two, or perhaps more, may be used to advantage in each of the stages of the process.

The first stage includes the heating and concentration of the brine to the point of complete saturation and the precipitation of the foreign substances held in solution. To accomplish this, the fresh brine is received in a broad and shallow pan, which is placed over the flue running from the furnace to the smoke-stack, and at such a distance from the furnace that the brine will be slowly evaporated to the point of saturation, but where the heat will not be so intense as to injure the material of which the pan is made. When the brine is concentrated to the point of saturation, the sulphates and chlorides of lime and magnesia, and other foreign compounds, will be precipitated in crystals upon the bottom of the pan. The brine, thus freed from its impurities, will now be drawn from the pan by means of a siphon or tube fitted in the side or end of the pan, but raised sufficiently from the bottom so as not to disturb the deposits into the pan placed directly over the furnace.

The second stage of my process includes the completion of the concentration of the brine after it has been purified as above described, and the crystallization of the salt therefrom. To effect this, the purified brine, already heated to nearly the boiling-point, is conducted to the pan directly over the fire-grates of the furnace, in which the evaporation and concentration are rapidly accomplished. The foreign substances which, by their corrosive property, attack the metal of the pans, and in a short time destroy them, or, by forming a coating upon their inner surfaces, cause them to be burned out, having been removed by the first stage of the process, the pan placed directly over the furnace can be constructed of much thinner metal than would otherwise be practicable. This thinness of metal of which this pan can be constructed greatly facilitates the concentration of the brine, inasmuch as it allows the ready passage of the heat from the furnace to the brine. The brine having been thoroughly purified, there will be no incrustations of non-conducting substances to contend with. Pure crystallized salt will be deposited in the bottom of the pan soon after the second stage commences, which may be removed as rapidly as deposited, and the surface of the pan kept free and clean. By reason of the rapid evaporation of the brine, and the intense heat imparted to the crystallized salt in the bottom of the pan, the product will be in much finer crystals or grains, and, consequently, more merchantable than is possible by the ordinary methods.

A convenient and desirable apparatus or arrangement of pans and furnace for carrying my new process into practical use is shown in the accompanying drawing and hereinafter explained.

Referring to the drawing, Figure 1 is a perspective view of the evaporating apparatus with the pans set in position. Fig. 2 is a plan view of the same with the pans removed, to show the arrangement of grate-bars and flues.

A, B, C, D, and E are evaporating and concentrating pans, made of any desired material. F F, openings into the flues; G, smoke-stack; H H and L L, hurdles for draining the brine from the manufactured salt; K K, pockets for receiving the salt from the concentrating-pan A; P, orifice for the outlet of water from the gutter $a$; $b$, pulley-shaft to revolve the rakes in the pan A; $c$, sweep to clear the center of pan A; $h\ h\ h$, pipes leading from one pan to the others; $o\ o$, horizontally-revolving arms to which rakes are attached; $k\ k$, orifices to conduct the brine from the hurdles to the pans; $s\ s$, passages for the introduction of the steam from pan A underneath the pan C.

The pans D and E are designed and adapted to carry into practical operation the first stage of my process, as already described. The pans are set over the flues of the furnace, but removed at such a distance from the intense heat thereof as not to injure the material of which the pans are constructed. The brine is heated in these pans to the point of complete saturation, and the foreign compounds are precipitated. The flues leading from the furnace, instead of passing under these pans D and E, may be constructed to pass through them, and thus be completely surrounded by the brine to which the heat from the flues is imparted. When the deposits of foreign substances have collected on the bottoms of the pans D and E they may be removed in the usual ways. As soon as the impurities have been removed from the brine in the pans D and E by precipitation the brine is drawn from the pans by the use of siphons, or through tubes, and may be conducted directly into the pan A, situated immediately over the fire-grates of the furnace. The brine, already heated to nearly the boiling-point, will be concentrated with great rapidity in the shallow pan A. As the brine has been freed from its impurities it will have but a slightly-injurious effect upon the metal of the pan A, and it follows that this pan can be constructed of thin material, which will largely facilitate the evaporation of the brine. By reason of the extremely-rapid evaporation of the brine in this pan the quality of the salt will be much superior to that made by the ordinary methods.

The pan A may be circular in form, and may be arranged to support the pulley-shaft $b$, to which are attached the arms $o\ o$, which revolve with the shaft $b$. Attached to the arms $o\ o$ by flexible joints or hinges are a series of rakes, which sweep over the surface of the bottom of the pan, and are adapted, by reason of their flexible union to the arms, to conform to any inequalities of the surface. These rakes prevent the crystallized salt from adhering to the bottom of the pan, and as rapidly as deposited sweep it into the pockets K K. The single sweep $c$ clears the center of the pan.

The salt is taken from the pockets K K, the bottoms of which are on a lower level than the bottom of the pan A, to prevent the brine from carrying the salt back into the pan, and placed upon the adjacent hurdles L L, the drip of which is into the pockets K K.

In carrying into practice the second stage of my process, instead of conducting the purified brine directly from the pan D or E to the pan in immediate contact with the fires of the furnace, one or more intermediate pans may be used for the purpose of utilizing all the heat, and consequently facilitating the concentration. C and B of Fig. 1 of the drawing represents such intermediate pans. The pan B is placed over the pan A, its lower perimeter fitting closely to the upper edge of the pan A, so as to prevent the escape of the steam or heated vapors from the pan A, except through openings at the points $m\ m$. The pan B is convex or crowning from its circumference to its center, and its circumference rests so that the drip of the condensed steam will be discharged into the gutter $a$ on the circumference of the pan A, and can be conducted from the gutter at the orifice P. By this simple arrangement the condensed steam and vapor is readily disposed of. The uncondensed steam and vapors generated by the evaporation in the pan A are forced by pressure, through the openings at m m and the passage-ways s s, under the pan C, and furnish the caloric by means of which the pan C is heated and its contents evaporated. I do not regard these intermediate pans as essential to the practical operation of my invention, but as aids to the process in keeping constantly on hand a supply of purified brine, and under such conditions that the temperature imparted to it in the pans D and E will not only be retained but the evaporation and concentration be continually carried on.

The pans used in my process may be of any desired shape and size, and may be made of iron or steel plates, or of any other material adapted to this use.

When both of the purifying-pans D and E are used, it is designed to use them alternately. This permits of their being thoroughly cleaned after each charge has been passed forward into the crystallizing-pan without in the least interrupting the action of the furnace, since the one pan can be cleaned while a charge is being reduced and purified in the other, dampers being properly arranged for this purpose, to divert the hot-air currents from the one pan to the other.

It is deemed important to the proper operation of the purifying-pans, since they are exposed to the action of the products of combustion at a point where the heat has comparatively a low intensity, that they be made broad and shallow; and it is essential that the charge of brine, when introduced into one of these pans, be detained therein until brought to that temperature and degree of condensation at which the foreign matters which it is desired to eliminate are precipated. In this respect my process is wholly distinct from, and is believed to be a marked improvement over, those processes in which the brine is caused to flow in a continuous motion, whether by a circuitous path or otherwise, through a series of kettles less highly heated, and in which partial evaporation takes place, into those more highly heated and in which the work is completed. This well-known arrangement and mode of working a set or a series of sets of kettles is designed mainly to utilize, as far as possible, the heat contained in the escaping products of combustion; but its effects, by way of separating the foreign matters from the brine before the latter reaches the crystallizing-kettles, must necessarily be of the most imperfect character.

I am aware, also, that in those furnaces in which the kettles and pans are heated by steam, it has been proposed to extract the foreign matters from the brine in one set of vessels and then crystallize the salt in another set. The process thus worked requires a large consumption of fuel and becomes exceedingly expensive, and, besides, although the danger of burning the salt is in a large measure avoided, the slowness with which the evaporation goes on produces, on the whole, an inferior grade of salt.

My improved process combines the advantages of the various existing processes. By using broad shallow pans, set into the flues at a point remote from the grate, I utilize the heat in the escaping products of combustion. By detaining the brine in these primary pans until brought to the point of saturation, the foreign matters are precipitated; and this purification of the brine, as hereinbefore explained, enables me to use much thinner metal than would otherwise be possible for the pans which are placed directly over the fire.

From this again it results not only that there is a large saving of fuel as compared with the steam process, and large gain in the durability of the pans as compared with those processes in which the brine, without sufficient previous purification, is evaporated in vessels placed in direct contact with the fire, but also that the crystallization is effected much more rapidly than by any of the other processes, and, therefore, a finer and purer, as well as a cheaper, article is produced.

What I claim as new is—

The hereinbefore-described process of manufacturing chloride of sodium or common salt from saline waters which hold in solution foreign maters, the same consisting in the use of broad and shallow pans placed over the flues as well as over the fire-place of the furnace, and exposed to the direct contact of the products of combustion, the brine being detained in the primary pan or pans over the flues until brought to the point of saturation, and made to discharge the foreign matters, and then being carried forward to the remaining pan or pans, in which it is subjected to the more intense heat of the fire-place, until the crystallization of the salt takes place and the evaporation is complete.

WILLIAM HARRISON.

Witnesses:
BENJ. A. SMITH,
ROBERT H. DUNCAN.